United States Patent [19]

Sugiyama et al.

[11] Patent Number: 4,794,454

[45] Date of Patent: Dec. 27, 1988

[54] MOVEMENT DETECTION CIRCUIT OF A VIDEO SIGNAL USED IN A TELEVISION RECEIVER

[75] Inventors: Masato Sugiyama; Kenji Katsumata; Shigeru Hirahata; Isao Nakagawa, all of Yokohama; Sunao Suzuki, Kamakura; Masahiko Achiha, Iruma; Kazuo Ishikura, Hachioji, all of Japan

[73] Assignees: Hitachi, Ltd., Tokyo; Hitachi Video Engineering, Inc., Kanagawa, both of Japan

[21] Appl. No.: 105,013

[22] Filed: Oct. 6, 1987

[30] Foreign Application Priority Data

Oct. 6, 1986 [JP] Japan .................. 61-236135

[51] Int. Cl.[4] .................. H04N 7/18; H04N 5/21
[52] U.S. Cl. .................. 358/105; 358/167; 358/37; 358/166; 358/36
[58] Field of Search .................. 358/105, 31, 36, 37, 358/166, 167, 21 R

[56] References Cited

U.S. PATENT DOCUMENTS

| 4,090,221 | 5/1978 | Connor | 358/167 |
|---|---|---|---|
| 4,288,815 | 9/1981 | Miles | 358/105 |
| 4,389,665 | 6/1983 | Nagao et al. | 358/31 |
| 4,626,891 | 12/1986 | Achiha | 358/105 |
| 4,651,211 | 3/1987 | Weckenbrock et al. | 358/166 |
| 4,658,285 | 4/1987 | Lewis et al. | 358/36 |
| 4,688,084 | 8/1987 | Achida | 358/37 |

FOREIGN PATENT DOCUMENTS 123280 9/1980 Japan.
88018 11/1983 Japan.

Primary Examiner—James J. Groody
Assistant Examiner—John K. Peng
Attorney, Agent, or Firm—Antonelli, Terry & Wands

[57] ABSTRACT

A movement detection circuit for detecting movement information of a luminance signal and movement information of a chrominance signal of a television signal comprises a first movement detection circuit for detecting the movement information of the luminance signal and a second movement detection circuit for detecting the movement information of the chrominance signal. The first movement detection circuit detects the movement information of the luminance signal based on two signals spaced by one frame period, and the second movement detection circuit detects the movement information of the chrominance signal based on two signals spaced by two frames periods.

20 Claims, 11 Drawing Sheets

MOVEMENT DETECTION CIRCUIT OF A VIDEO SIGNAL USED IN A TELEVISION RECEIVER

BACKGROUND OF THE INVENTION

The present invention relates to a movement detection circuit used in a color television receiver, and more particularly to a movement detection circuit suitable for detecting movement information of image in a television receiver which receives an NTSC composite color television signal.

In the NTSC television system, a chrominance signal is transmitted by a sub-carrier modulated by the chrominance signal. The sub-carrier is supermmposed on an area of 2.1–4.2 MHz in a 4.2 MHz video signal band. A frequency $f_{sc}$ of the sub-carrier and a horizontal scan frequency $f_H$ have a relationship of $$f_{sc} = \frac{455}{2} f_H$$

and the horizontal scan frequency $f_H$ and a vertical scan frequency $f_V$ have a relationship of $$f_H = \frac{525}{2} f_V$$

A luminance signal and the chrominance signal are frequency-interleaved with each other.

A phase of the sub-carrier is reversed at an interval of one frame period. Thus, when two composite signals spaced by one frame period are added, the luminance signal is produced, and when they are subtracted, the chrominance signal is separated. Thus, for a still image, a cross-component such as cross-color or dot disturbance is eliminated and a substantially perfect luminance signal and chrominance signal are produced and the quality of image of the television receiver is improved.

However, when the two signals spaced by one frame period are processed for dynamic images, double images appear on a picture screen of the television receiver or an elimination effect for the cross-component disappears and the dot disturbance appears. As a result, the image quality is deteriorated.

JP-A No. 55-123280 discloses an apparatus for detecting movement of an image by detecting a difference between two scan line signals spaced by one frame period. This apparatus detects that the movement of the detected image is small, that is, the image is a still image when the differential signal is small and processes the two signals spaced by one frame period to separate the luminance signal and the chrominance signal. When the differential signal is large, it detects that the movement of the image is large, that is, the image is a dynamic image, and scan line signals are processed in the field to separate the luminance signal and the chrominance signal. This apparatus is known as a movement adapted signal processor.

As described above, the phase of the chrominance sub-carrier is reversed at an interval of one frame period. Accordingly, if a difference between two composite color televisionssignals spaced by one frame period is simply determined, a differential signal based on the movement of the image and the differential signal based on the phase difference of the sub-carrier are detected in mixture. As a result, the still image may be detected as the dynamic image by the presence of the chrominance signal.

In the prior art, the differential signal of the chrominance signal band centered at the frequency $f_{sc}$ is eliminated from the differential signal of the two scan lines spaced by one frame period by the lowpass filter, and only the differential signal of the luminance signal is detected and the movement of the image is detected.

On the other hand, a technique has been known where an interlace scan signal used in the TTSC system is converted to a sequential scan signal to display the image. This apparatus uses a field memory and an interpolating scan line signal is generated by using a one-field prior scan line signal to produce the sequential scan signal. This apparatus can eliminate a line flicker generated at edges of a lateral line included in the image. The interpolation of the signal between the fields has a large effect on the still image but it creates an interdigital double-image to the dynamic image.

JP-A No. 58-205377 discloses an adaptive processor which detects the movement of the image based on the differential signal of two signals spaced by one frame period, and when the movement of the image is small, a signal to be interpolated is generated based on the signals of different fields, and when the movement of the image is large, the interpolating scan line signal is generated by using the scan line signal in the same field.

As shown in FIG. 2, when an image J of an object moves from a top to a bottom of aniimage screen P, the movement of the object image is represented as shown in FIG. 3 by using an interlace scan line, where an ordinate is along the vertical direction of the screen and an abscissa represents a time axis.

In FIG. 3, circles represent scan lines 1 (in sectional view). When an interpolating scan line of an M-th field shown by a triangle is to be generated, it is necessary to generate the interpolating scan line based on a signal in the same field because the image is a dynamic image. However, as sen from FIG. 3, a differential signal between a signal on a scan line $l_{M-1}$ in the (M−1)th field and a signal on a scan line $l_{M+1}$ in the (M+1)th field is zero because both scan line signals are equal. Accordingly, the movement (change) of the triangle scan line signal is not detected from the differential signal of the one-frame spaced signals. As a result, the prior art circuit effects to the dynamic image the interfield interpolation which is to be done to the still image, that is, generates the interpolation signal based on the signals in the (M−1)th field and the (M+1)th field. As a result, the image quality is deteriorated.

As shown in FIG. 4(a), when the object image J moves vertically, the movement information detected from the interframe differential signal indicates movement in areas ($L_0-L_1$) and ($L_2-L_3$), and non-movement in an area ($L_1-L_2$) as shown in FIG. 4(b). Since the detection is in error in the non-movement information area ($L_1-L_2$), a correction is usually made, and corrected movement information as shown in FIG. 4(c) is produce.

However, in the prior art, when two frames $W_1$ and $W_2$ move slowly as shown in FIG. 5(a), the detected movement information is the same as that shown in FIG. 4(b), and the corrected movement information is the same as that shown in FIG. 4(c). As a result, an object image S between the frames $W_1$ and $W_2$ $_a$ is processed as the dynamic image although it is a still image.

The technique disclosed in JP-A No. 55-123280 cannot correctly detect the movement information of the image in which only the chrominance signal changes. As a result, the still image processing is effected for the image whose color changes, and the image quality is deteriorated.

The technique disclosed in JP-A No. 58-205377 controls the processing of the interfield signal by detecting the two signals spaced by one frame period but it cannot correctly detect the fast movement of the object. A movement detection circuit for detecting the movement information of the chrominance signal is disclosed in U.S. patent application Ser. No. 932376.

SUMMARY OF THE INVENTION

It is an object of the present invention to provide a movement detection circuit which eliminates the problems encountered in the prior art circuits and which can correctly detect the movement of an image in which only color changes or which moves fast.

The movement detection circuit of the present invention comprises a first movement detection circuit for detecting movement information of a luminance signal and a second movement detection circuit for detecting movement information of a chrominance signal. The first movement detection circuit detects the movement information of the luminance signal based on two signals spaced by one frame period. The second movement detection circuit detects the movement information of at least the chrominance signal based on two signals spaced by two frame periods. Those two movement information signals are combined in an adder circuit. Accordingly, the movement information of the image is correctly detected.

In the movement detection circuit of the present invention, the movement information produced by the adder circuit is supplied to a time space filter, which uses the movement information of one pixel signal as well as the movement information of the time-spatially surrounding pixels, that is, past vertically and horizontally adjacent pixels. In this manner, misdetection for a fast moving object is prevented.

DESCRIPTION OF THE PREFERRED EMBODIMENTS

Figure 1:
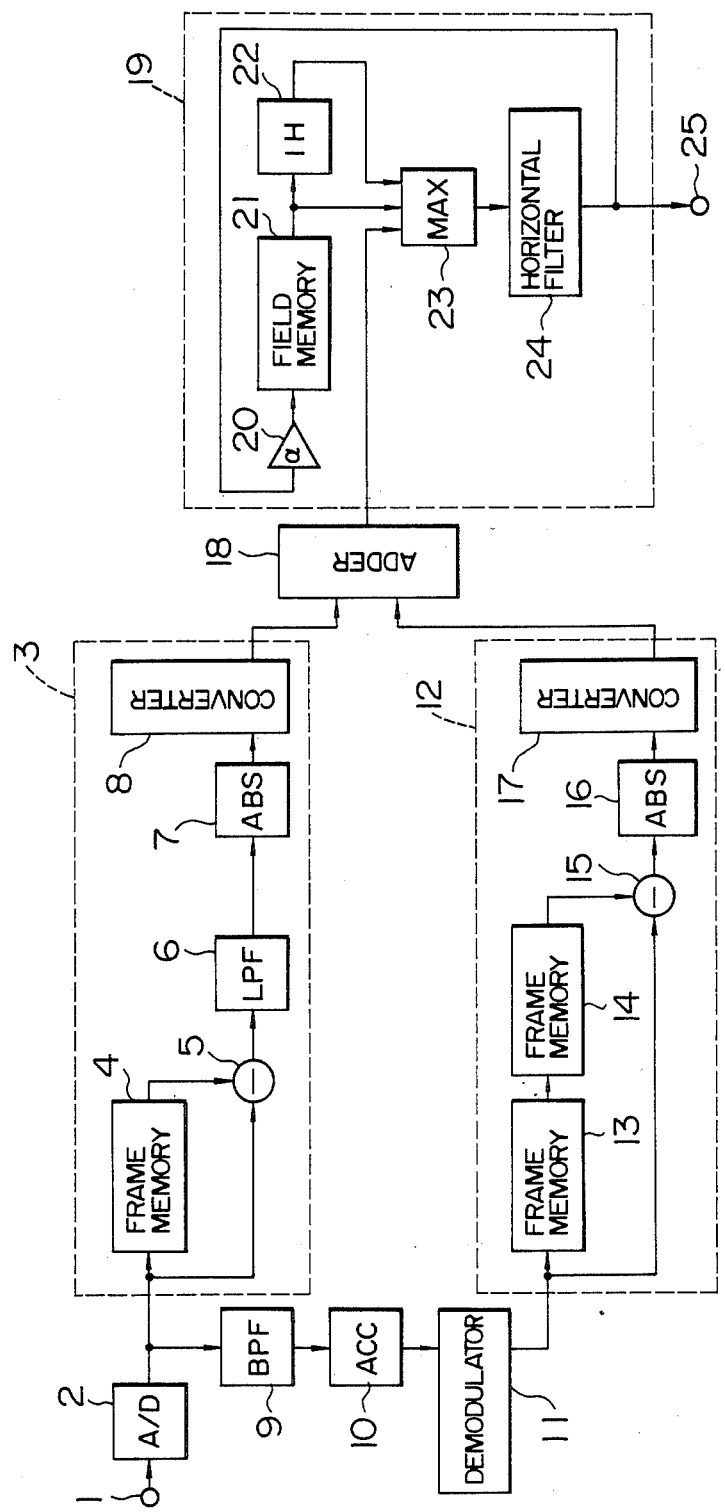
FIG. 1 shows a block diagram of a first embodiment of a movement detection circuit of the present invention.
Figure 2:
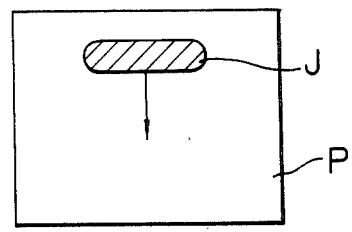
FIG. 2 shows a moving image of a falling object.
Figure 3:
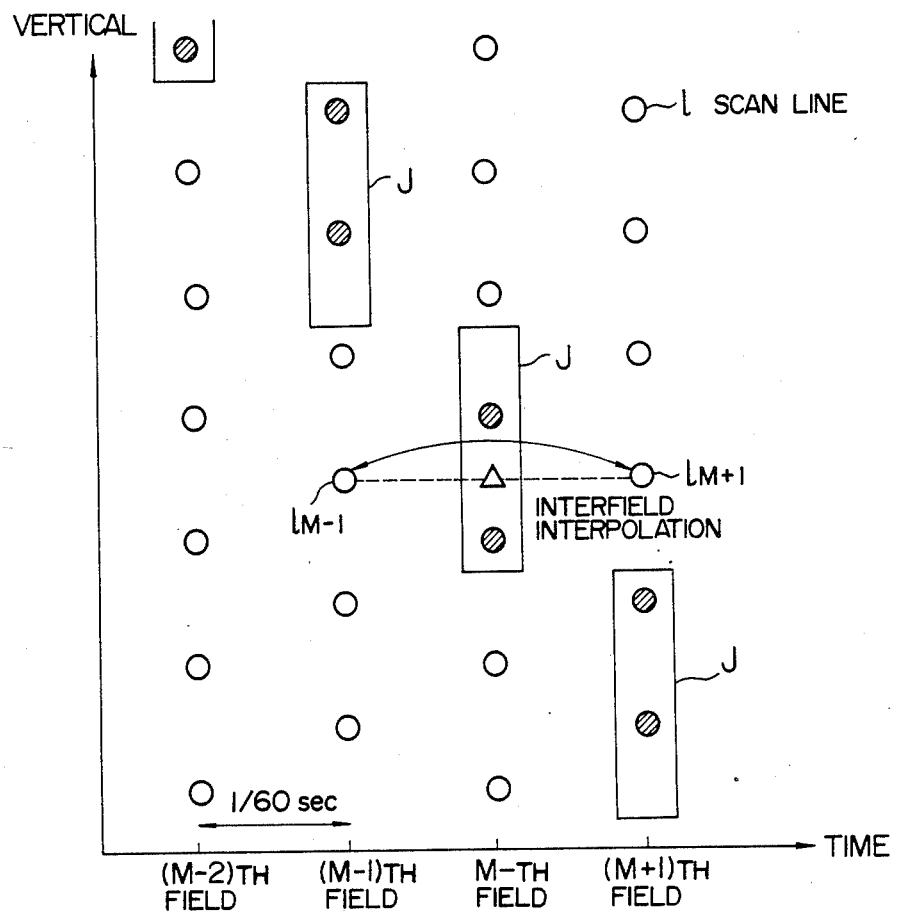
FIGS. 3, 4 and 5 illustrate how movement of image is misdetected in a prior art apparatus.
Figure 4:
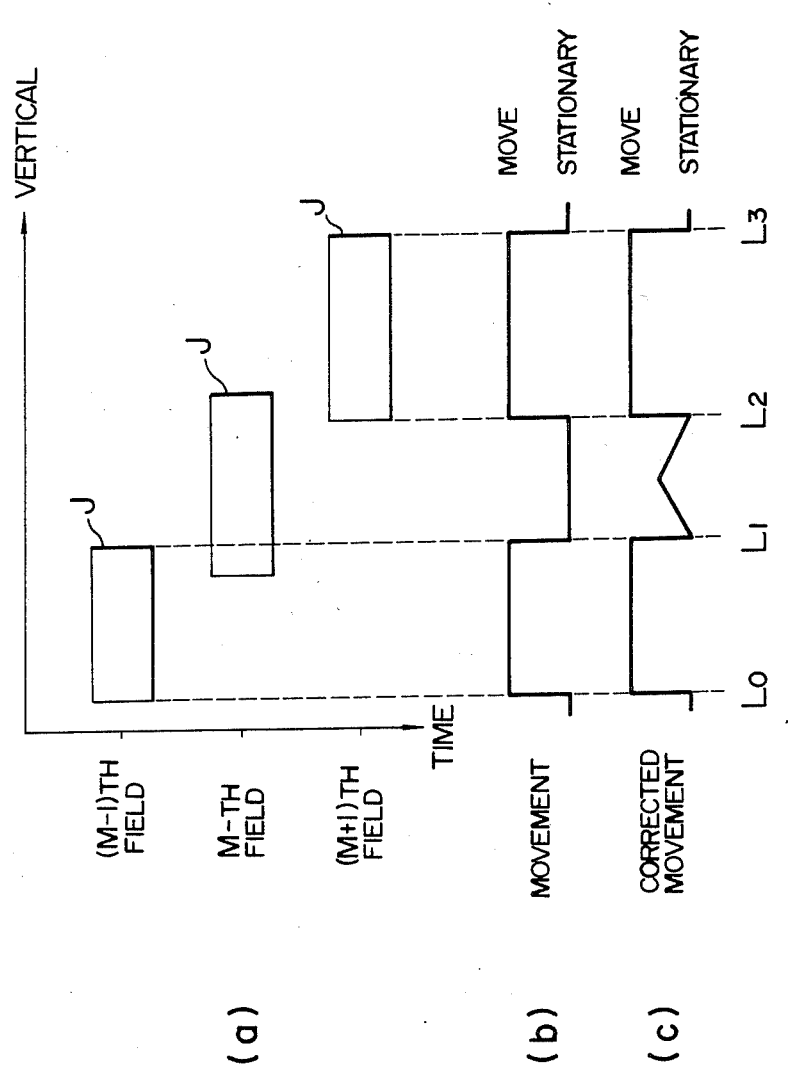
Figure 5:
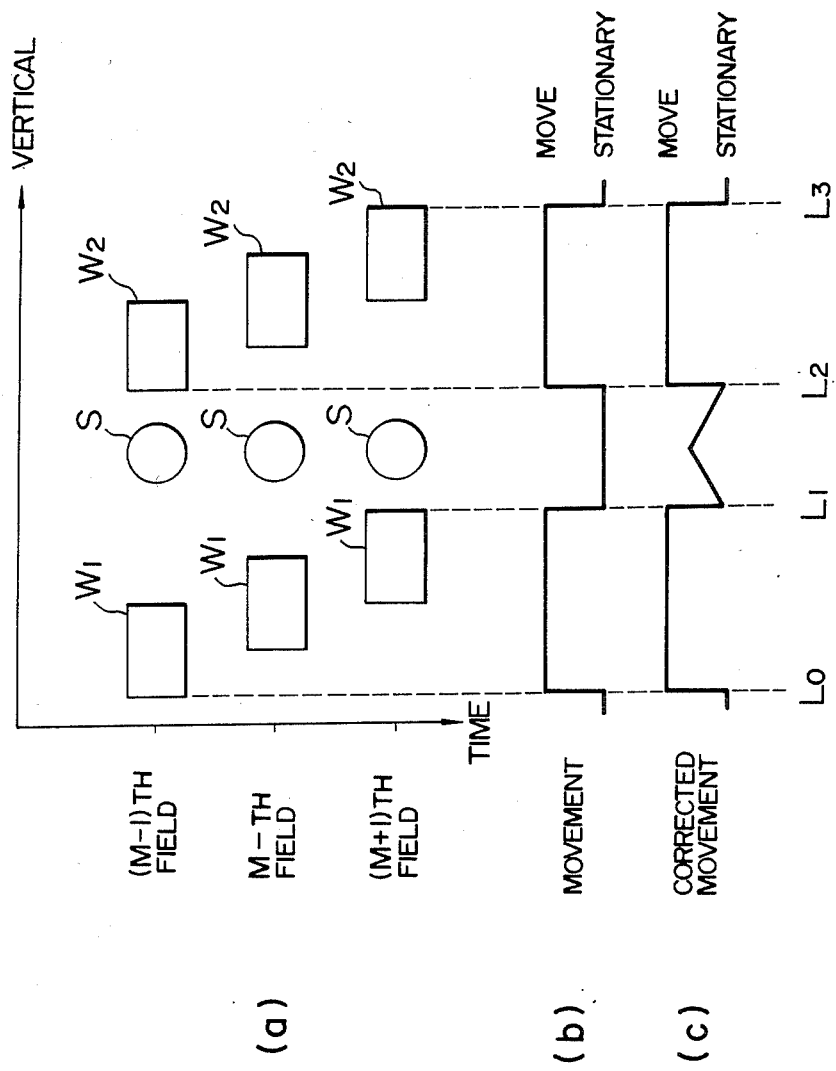

A first embodiment of the present invention will be explained with reference to FIG. 1.

An analog composite color television signal applied to an ipput terminal 1 is supplied to a first analog-digital converter (ADC) 2, where it is converted to a digital signal. The digitized composite color television signal is supplied to a first detector 3 which detects movement of a low frequency signal component of a luminance signal. In the first detector 3, the digital composite color television signal is supplied to a first frame memory 4, and a signal delayed by one frame period in the frame memory 4 and an input signal to the frame memory 4 are supplied to a subtractor 5 which produces a one-frame differential signal. The output signal of the subtractor 5 is supplied to a low pass filter (LPF) 6 which eliminates a signal in a chrominance signal band. The output signal of the LPF 6 includes movement information of a luminance signal low frequency component. When the output signal of the LPF 6 is zero, it is determined that the image is a still image, and when the output signal is not zero, it is determined that the image is a dynamic image. Since the output signal of the LPF 6 has a polarity, the output signal is supplied to an absolute value circuit 7 which produces an absolute value thereof.

Figure 6:
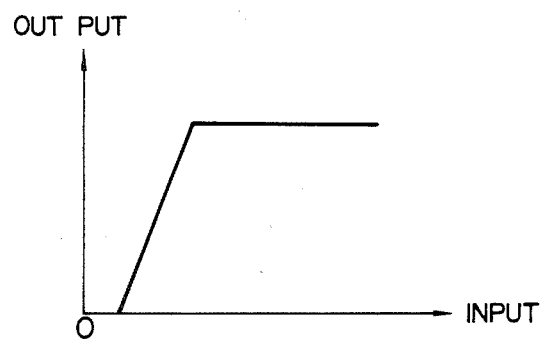
FIG. 6 shows a conversion characteristic of a conversion circuit.

The video signal is usually quantamized in eight bits. Accordingly, the output signal of the absolute value circuit 7 is also an 8-bit signal. The switchin of the signal processing due to the movement of the image will be effected smoothly if it is siitched in ten steps. This can be controlled by a 4-bit signal. A conversion circuit 8 has an input/output characteristic as shown in FIG. 6 and non-linearly converts the 8-bit input signal to a 4-bit signal. As a result, the number of signal lines is reduced and the affect by noise is eliminated by rendering the output signal zero for a low level input signal.

On the other hand, the digital composite color television signal produced by the first ADC 2 is supplied to a band pass filter (BPF) 9 which produces a signal in the chrominance signal band. The output signal of the BPF 9 is supplied to an automatic color control circuit (ACC) 10 which produces a chrominance signal of a substantially constant amplitude, corrected for variation of the chrominance signal level due to the frequency characteristic of the transmission line.

Then, the chrominance signal is demodulated by a demodulator 11. When a sampling frequency of the ADC 2 is selected to $4f_{sc}$, a sampling signal at one of four continuous sampling points is a signal $-(B-Y)$, a signal at the next sampling point is $(R-Y)$, the next signal is $(B-Y)$, and the next signal is $-(R-Y)$. Accordingly, by inverting the signals $-(R-Y)$ and $-(B-Y)$, the signals $(R-Y)$ and $(B-Y)$ alternately appear. Thus, the output of the demodulator 11 is a sequentially multiplexed signal of the two chrominance differential signals $(R-Y)$ and $(B-Y)$.

The phase of the chrominance sub-carrier is reversed at the interval of one frame as described above. The demodulator 13 acts to cancel the reversal of the phase of the chrominance sub-carrier. The signal in the chrominanee signal band applied to the demodulator 11 includes the chrominance signal as well as a high frequency copponent of the luminance signal. Accordingly, the output of the demodulator 11 includes the reversal of the high frequency component of the luminance signal.

The output of the demodulator 11 is supplied to a second detector 12 which detects the movement of the signal in the chrominance signal band. The output signal of the demodulator 11 is applied to a second frame memory 13 where it is delayed by one frame period. The output signal of the second frame memory 13 is applied to a third frame memory 14 where it is further delayed by one frame period.

The output signal of the demodulator 11 and the signal delayed by the two frame periods by the frame memories 13 and 14 are supplied to a subtractor 15 which produces a two-frame differential signal. The phases of the chrominance signals and the high frequency components of the luminance signals for the signals spaced by two frame periods are equal and the two-frame differential sinnal is zero for the still image. Accordingly, if the two-frame differential signal is not zero, it is determined that the image is a dynamic image.

An absolute value circuit 16 and a conversion circuit 17 operate in the same manner as the absolute value circuit 7 and the conversion circuit 8, respectively, and the output signal of the subtractor 15 is converted to a 4-bit control signal.

Figure 7A:
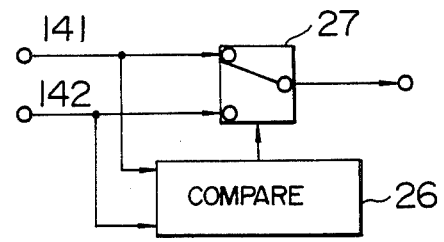
FIGS. 7A to 7C show block diagrams of an adder circuit.
Figure 7B:
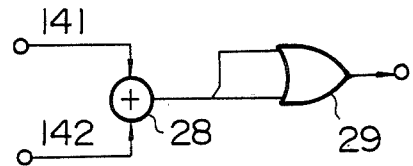
Figure 7C:
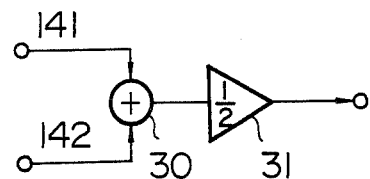

The output signal of the first detection circuit 3 and the output signal of the second detection circuit 12 are supplied to an adder circuit where they are combined. Thus, the output signal of the adder circuit 18 contains the movement information of the signal in the entire band of the composite color television signal. FIG. 7 shows a configuration of the adder circuit 18. In FIGS. 7A-7C, numeral 26 denotes a comparator, numeral 27 denotes a selector, numerals 28 and 30 denote adders, numeral 29 denotes an OR circuit and numeral 31 denotes a coefficient circuit. The circuit of FIG. 7A compares two input signals 141 and 142 by the comparator 26 and selects the larger one by the selector 27. The circuit of FIG. 7B adds the two input signals 141 and 142 by the adder 28 and clips the output in the OR circuit 28 by the most significant bit (MSB). The circuit of FIG. 7C adds the input signals 141 and 142 by the adder 30 and calculates a mean value by the coefficient circuit 31.

The movement adder circuit 18 may compare the two input signals 141 and 142 and select the smaller one.

The output signal of the adder circuit 18 is supplied to a time space filter 19, which compares the movement information of vertically and horizontally adjacent pixels and past pixels with the output signal of the adder circuit 18. It comprises a coefficient circuit 20, a field memory 21, a line memory 22, a maximum value circuit 23 and a horizontal filter 24. The coefficient circuit 20 multiplies the output signal of the time space filter 19 by a factor of $\alpha$ ($0<\alpha<1$) and supplies the multiplied signal to the field memory 21. The maximum value circuit 23 determines a maximum one of the output signal of the adder circuit 18 and the two signals delayed by 262H periods and 233H periods by the field memory 21 and the line memory 22. The signal selected by the maximum value circuit 23 is then filtered horizontally by the horizontal filter 24. In the present embodiment, the time space filter 19 is of feedback type. Accordingly, the movement information of many pixels are compared with the output signal of the adder circuit 18. When the coefficient $\alpha$ is close to 1, the movement information of more pixels are utilized, and when the coefficient $\alpha$ is close to 0, the movement infommation of less pixels are utilized.

In the present embodiment, the output signal of the first detection circuit 3 and the output signal of the second detection circuit 12 are combined in the adder circuit 18 to produce the movement information of signal in the entire band of the composite color television signal, and the movement information is filtered by the time space filter 19 so that misdetection for the fast movement of the object is prevented. In this manner, the movement information of the image is correctly detected.

Since the time space filter is of feedback type, the movement information in a wide range of pixels can be utilized without increasing the memory capacity, and the misdetection is effectively prevented.

Figure 8A:
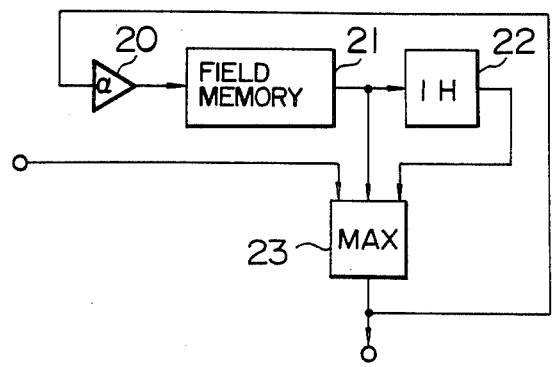
FIGS. 8A and 8B show block diagrams of a time space filter.
Figure 8B:
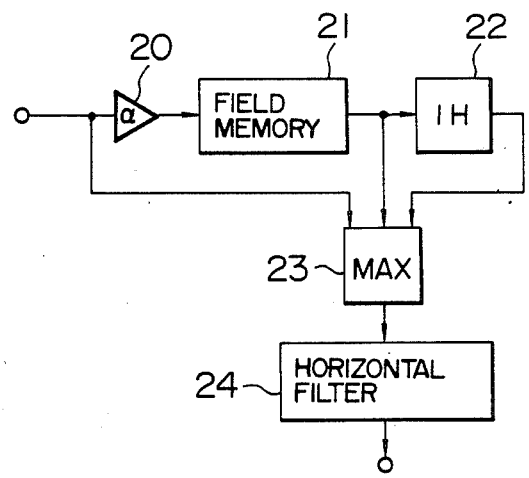

The time space filter 19 in the present invention is not limited to the illustrated embodiment. It may be constructed as shown in FIGS. 8A and 8B. In the circuit of FIG. 8A, the horizontal filter 24 of FIG. 1 is omitted. This circuit cannot utilize the movement information of the horizontal (lateral) pixels but can utilize the movement information of vertical and time-axis (past) pixels by appropriately selecting the coefficient $\alpha$.

The circuit of FIG. 8B is of feed-forward type. This circuit utilizes the movement information of only the adjacent pixels. In this circuit, erroneous movement information due to noise does not spread to the surrounding pixels. In the feed-forward circuit shown in FIG. 8B, the coefficient $\alpha$ may be 1.

In the embodiment shown in FIG. 1, the signal applied to the frame memories 13 and 14 is limited to the chrominance signal band by the BPF 9. Accordingly, the secodd and third frame memories 13 and 14 may be of one-half memory capacity of the first frame memory 4.

Figure 9:
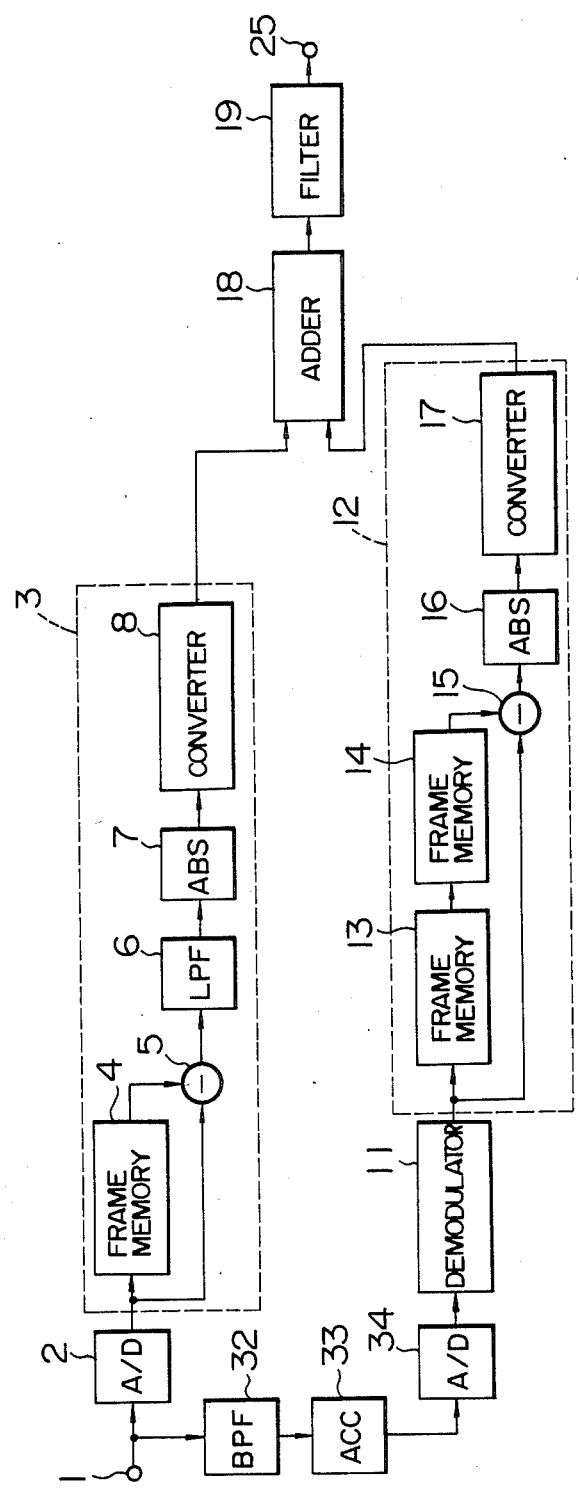
FIGS. 9 to 11, 12A, 12B and 14 show block diagrams of other embodiments of the present invention.

FIG. 9 shows another embodiment of the present invention.

In the circuit shown in FIG. 1, the composite color television signal is AD-converted and the signal in the chrominance signal band is produced by the BPF 9. Accordingly, the BPF 9 and the ACC 10 are digital circuits. In the digital video signal processing circuit, the BPF 9 is usually constructed by a transversal filter and the circuit scale thereof tends to be large. Since the ACC circuit 10 is constructed by a variable gain circuit, the circuit scale is large if it is constructed by the digital circuit.

In the circuit of FIG. 9, a BPF 32 and an ACC 33 are analog circuits and the signal in the chrominance signal band is AD-converted by a second ADC 34. The analog composite color television signal applied to the input terminal 1 is supplied to the second ADC 34 through the BPF 32 and the ACC 33, where it is converted to a digital signal. The output signal of the second ADC 34 is applied to the demodulator 11 where it is demodulated to the chrominance signal. The output signal of the demodulator 11 is equivalent to the output signal of the demodulator 11 of the first embodiment. The functions of other circuits are identical to those of the circuit of FIG. 1.

If the demodulator is also an analog circuit and the two chrominance differential signals (B−Y) and (R−Y) are AD-converted by AD conversion circuits, it is suitable as a signal processing circuit for the component signal.

Figure 10:
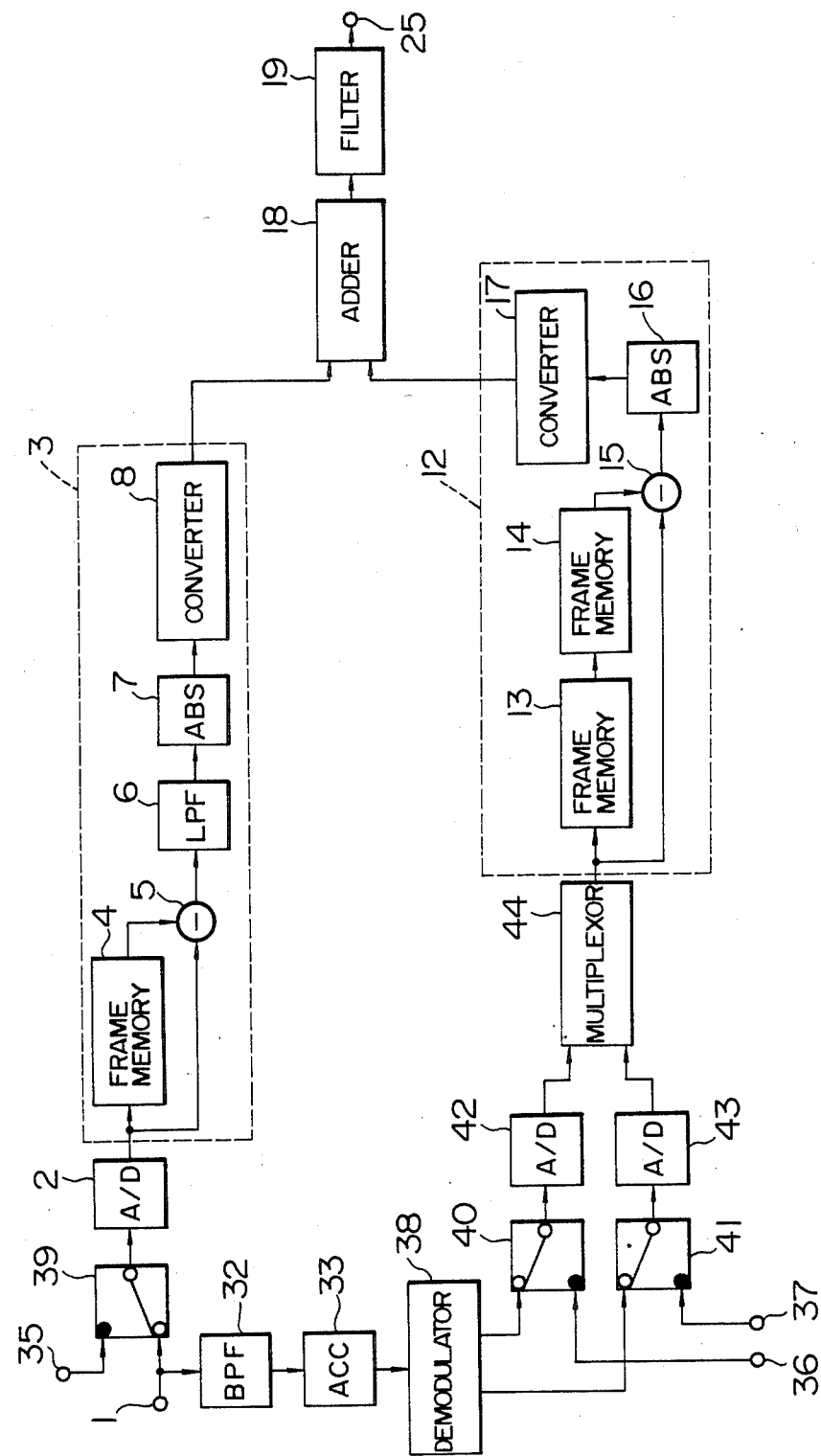

Such an embodiment is shown in FIG. 10. Numerals 35, 36 and 37 denote component signal terminals, numeral 38 denotes an analog demodulator, numerals 39, 40 and 41 denote selectors which are switched between composite signal input and component signal input, numerals 42 and 43 denote third and fourth ADC's, numeral 44 denotes a multiplexor and other numerals denote the same elements as those shown in FIG. 9.

The chrominance signal contained in the signal applied to the input terminal 1 is demodulated by the demodulator 38, and the two demodulated chrominance differential signals (R−Y) and (B−Y) are supplied to the third ADC 42 and the fourth ADC 43 through the eelectors 40 and 41, respectively. The two chrominance differential signals (R−Y) and (B−Y) are converted to digital signals by the ADC's 41 and 42, respectively, and they are point-sequentially multiplexed by the multiplexor 44. The functions of other circuits are similar to those of the circuits of the embodiment of FIG. 9.

On the other hand, the component signals, that is, the luminance signal applied to the input terminal 35 and the chrominance signals applied to the input terminals 36 and 37 are selected by dot contacts of the selectors 39–41.

The chrominance differential signal is not contained in the luminance signal applied to the input terminal 35 and hence the LPF 6 in the embodiment of FIG. 1 is not necessary. Accordingly, the LPF 6 of the detection circuit 3 may be bypassed when the component signal is inputted. One of the second frame memory 13 and the third frame memory 14 may be omitted. In this manner, the movement detection ability of the component signal is improved.

Figure 11:
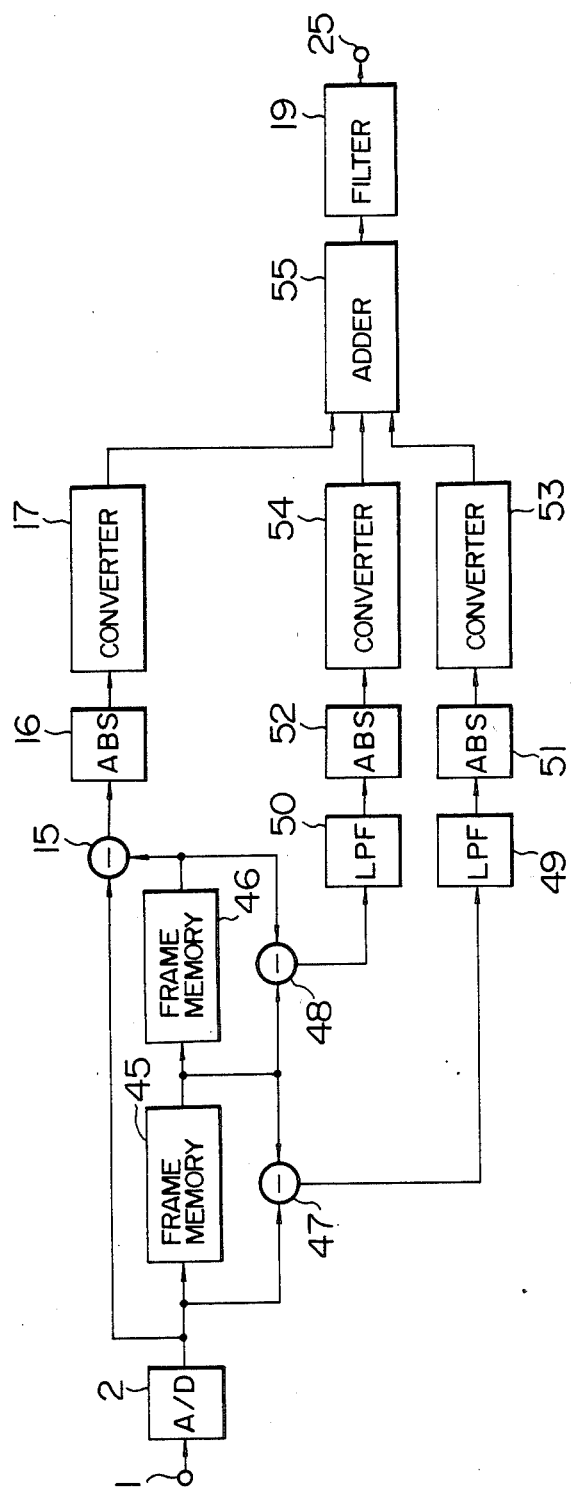

In the above embodiments, the composite color television signal is divided into the luminance signal and the chrominance signal, which are stored in the memory and processed. Alternatively, the composite color television signal may be stored in the memory as it is and processed. Such an embodiment is shown in FIG. 11.

In the present embodiment, a differential signal of the composite color television signal converted to a digital signal by the ADC 2 and the signal delayed by two frame periods by the frame memories 45 and 46 is produced by the subtractor 15.

On the other hand, a dffferential signal of the input/output signals of the frame memory 45 is produced by the subtractor 47 and the differential signal produced by the subtractor 47 is supplied to a LPF 49, where the signal in the chrominance signal band is eliminated by the LPF 49. Then, the differential signal is supplied to an absolute value circuit 51 and a converter 55 which converts it to a 4-bit signal representative of the movement of the image. Similarly, the differential signal of the input/output signals of the frame memory 46 is produced by the subtractor 48 and it is supplied to a LPF 50, where the signal in the chrominance signal band is eliminated. Then, the differential signal is supplied to an absolute value circuit 52 and a conversion circuit 54 which converts it to a 4-bit signal representative of the movement of the image.

An adder circuit 55 combines the output signals of the conversion circuits 17, 53 and 54 to generate a movement information signal for the signal in the entire band of the composite color television signal. The adder circuit 55 detects a maximum value or a mean value of the input signals.

In the embodiment shown in FIG. 11, the band of the two-frame differential signal produced by the subtractor 15 is not limited. In the present embodieent, the low frequency one-frame differential signal and the all-band two-frame differential signal are used as th movement information of the luminance signal. Accordingly, the high precision detection of the movement is attained.

In the present embodiment, one-frame differential signals are produced by both the frame memory 45 and the frame memory 46. Alternatively, the one-frame differential signal may be produced by only one of the frame memories. In this case, the subtractor, LPF, absolute value circuit and conversion circuit in one channel are not necessary.

Figure 12A:
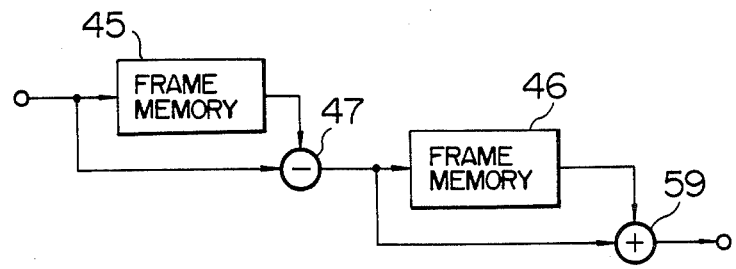
Figure 12B:
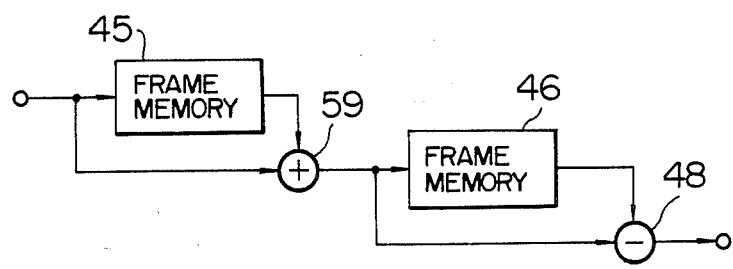

In the above embodiments, the two-frame differential signal is produced by the two series-connected frame memories. FIGS. 12A and 12B show other circuits for producing the two-frame differential signal.

In FIG. 12A, the one-frame differential signal produced by the frame memory 45 and the subtractor 47 are supplied to the frame memory 46 and a sum signal of the input/output signals of the frame memory 46 is produced by the adder 59 to produce the two-frame differential signal.

The signals supplied to the frame memory 45 are represented by $F_n$, $F_{n+1}$, $F_{n+2}$, - - - for each frame. Thus, the output signal of the subtractor 47 is $(F_n - F_{n-1})$. The output signal of the frame memory 46 is $(F_{n-1} - F_{n-2})$. As a result, the two-frame differential signal $(F_n - F_{n-2})$ is produced at the output of the adder 59.

In the circuit shown in FIG. 12B, one-frame differential signal produced by the frame memory 45 and the adder 59 is supplied to the frame memory 46, and the two-frame differential signal is produced by producing the differential signal of the input/output signals of the frame memory 46 by the subtractor 48.

In the circuit to produce the two-frame differential signal, the preceding stage frame memory 45 is also used to separate YC while the succeeding stage frame memory 46 is used to produce the two-frame differential signal to detect the movement. Accordingly, it is not necessary to store information of all pixels in the latter frame memory 46. For example, sufficiently highly accurate movement detection is attained even if one pixel is removed from every four pixels.

Figure 13A:
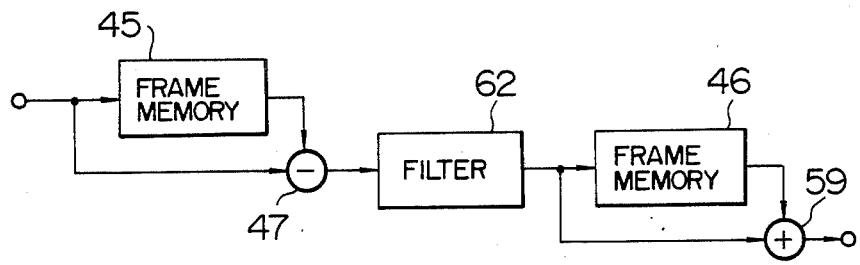
FIGS. 13A and 13B show block diagrams of a circuit for producing a differential signal of signals spaced by two frame periods.
Figure 13B:
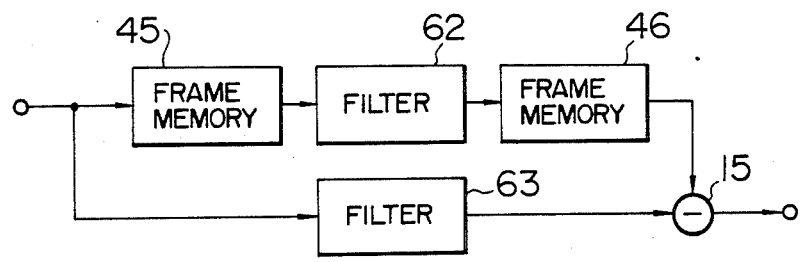

Such an embodiment is shown in FIGS. 13A and 13B.

A filter 62 in FIG. 13A may be a latch which reduces a sampling rate by a factor of ¼. In FIG. 13B, two filters 62 and 63 may be latches which remove pixel signals spaced by one frame period.

In this circuit, the memory capacity of the frame memory 46 may be approximately one quarter of that of the frame memory 45.

Figure 14:
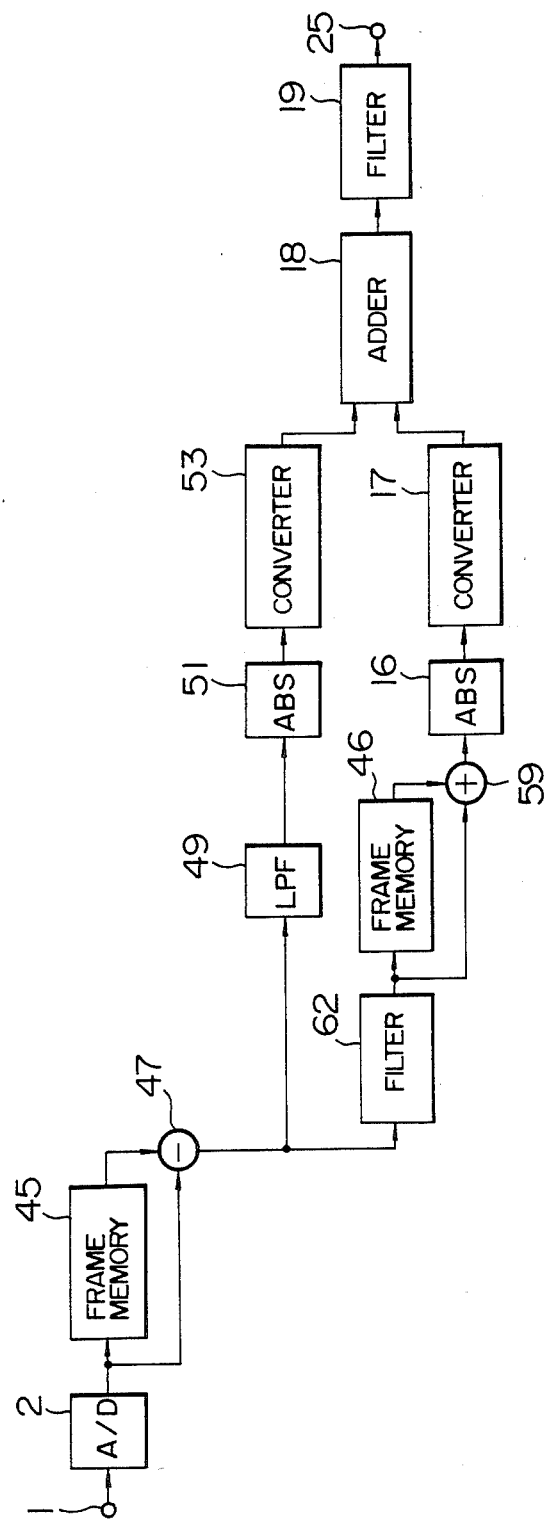

FIG. 14 shows another embodiment of the present invention. The present embodiment is a combination of the circuits of FIG. 11 and FIG. 13A. The one-frame differential signal is produced by the frame memory 45 and the two-frame differential signal is produced by the deletion of the filter 62.

In the above embodiments, the output signals of the conversion circuits 8, 17, 53 and 54 are supplied to the adder circuit 18. Alternatively, the output signals of the absolute value circuit 7, 16, 51 and 52 may be supplied to the adder circuit 18 and the output signal of the adder circuit 18 may be supplied to the conversion circuit. In this case, the number of conversion circuits can be reduced.

The movement detection circuit of the present invention detects the movement information of the luminance signal based on the low frequency component of the one-frame differential signal and detects the movement information of the signal in at least the chrominance signal band based on the two-frame differential signal so that it detects the movement of the signals in the entire band of the composite color television signal. Since the movement information of the entire band signal is filtered by the time space filter, the movement information for fast moving object can be detected.

In accordance with the movement detection circuit of the present invention, the movement information of the image in the composite color television signal can be correctly detected.

We claim:

1. A movement detection circuit used in a television receiver for detecting movement information of a video signal, comprising:
   (a) an input terminal for receiving a composite video signal;
   (b) an analog-digital converter connected to said input terminal for receiving the composite video signal from said input terminal and converting the input composite video signal to an m-bit digital signal;
   (c) first movement information detection means connected to said analog-digital converter for receiving the digital composite video signal from said analog-digital converter to generate a first movement information signal;
   said first movement information detection means including a first frame memory for delaying the digital composite video signal by one frame period, and a first subtractor connected to said first frame memory for subtracting the digital composite video signal from the delayed composite video signal delayed by said first frame memory to generate the first movement information signal;
   (d) chrominance signal demodulation means connected to said analog-digital converter for receiving the digital composite video signal from said analog-digital converter to reproduce a chrominance signal therefrom;
   (e) second movement information detection means connected to said chrominance signal demodulation means for receiving the chrominance signal from said chrominance signal demodulation means to generate a second movement information signal;
   said second movement information detection means including a second frame memory for delaying the chrominance signal supplied thereto by two frame periods, and a second subtractor connected to said second frame memory for subtracting the chrominance signal supplied from said chrominance signal demodulation means from the delayed chrominance signal delayed by said second frame memory to generate the second movement information signal; and
   (f) a signal combination circuit connected to said first movement information detection means and said second movement information detection means for receiving the first movement information signal from said first movement information detection means and the second movement information signal from said second movement information detection means and combining the first and second movement information signal to generate a combined movement information signal.

2. A movement detection circuit according to claim 1 wherein said first movement information detection means includes a first absolute value circuit for generating an absolute value signal of the first movement information signal.

3. A movement detection circuit according to claim 1 wherein said first movement information detection means includes a low pass filter connected to said first subtractor and a first absolute value circuit connected to said low pass filter for generating the absolute value signal of the first movement information signal.

4. A movement detection circuit according to claim 1 wherein said second movement information detection means includes a second absolute value circuit for generating an absolute value signal of the second movement information signal.

5. A movement detection circuit according to claim 3 wherein said first movement information detection means includes a first conversion circuit connected to said first absolute value circuit for converting an m-bit signal to an n-bit signal, where $n < m$.

6. A movement detection circuit according to claim 4 wherein said second movement information detection means includes a second conversion circuit connected to said second absolute value circuit for converting an m-bit signll to an n-bit signal, where $n < m$.

7. A movement detection circuit according to claim 1 wherein said movement detection circuit includes a time spatial filter connected to said signal combination circuit.

8. A movement detection circuit used in a television receiver for detecting movement information of a video signal, comprising:
   (a) an input terminal for receiving a composite video signal;
   (b) a first analog-video converter connected to said input terminal for receiving the composite video signal from said input terminal and converting the input composite video signal to a first m-bit digital signal;
   (c) first movement information detection means connected to said first analog-digital converter for receiving the first digital composite video signal from said first analog-digital converter to generate a first movement information signal;
   said first movement information detection means including a first frame memory for delaying the first digital composite video signal by one frame period, and a first subtractor connected to said first frame memory for subtracting the first digital composite video signal from the delayed composite video signal delayed by said first frame memory to generate a first movement information signal;
   (d) a second analog-digital converter connected to said input terminal for receiving the composite video signal from said input terminal to convert the input composite video signal to a second m-bit digital signal;
   (e) chrominance signal demodulation means connected to said second analog-digital converter for receiving the second digital composite video signal from said second analog-digital converter to reproduce a chrominance signal therefrom;
   (f) second movement information detection means connected to said chrominance signal demodulation means for receiving the chrominance signal from said chrominance signal demodulation means to generate a second movement information signal,
   said second movement information detection means including a second frame memory for delaying the chrominance signal supplied thereto by two frame periods, and a second subtractor connected to said second frame memory for subtracting the chrominance signal supplied from said chrominance signal demodulation means from the delayed chrominance signal delayed by said second frame memory to generate the second movement information signal; and (g) a signal combination circuit connected to said first movement information detection means and said second movement information detection means for receiving the first movement information signal from said first movement information detection means and the second movement information signal from said second movement information detection means and combining the first and second movement information signals to generate a combined movement information signal.

9. A movement detection circuit according to claim 8 wherein said first movement information detection means includes a first absolute value circuit for producing an absolute value of the first movement information signal.

10. A movement detection circuit according to claim 8 wherein said first movement information detection means includes a low pass filter connected to said first subtractor and a first absolute value circuit connected to said low pass filter for producing an absolute value of the first movement information signal.

11. A movement detection circuit according to claim 8 wherein said second movement information detection means includes a second absolute value circuit for generating an absolute value signal of the second movement information signal.

12. A movement detection circuit according to claim 10 wherein said first movement information detection means includes a first conversion circuit connected to said first absolute value circuit for converting an m-bit signal to an n-bit signal, where $n<m$.

13. A movement detection circuit according to claim 11 wherein said second movement information detection means includes a second conversion circuit connected to said second absolute value circuit for converting an m-bit signal to an n-bit signal, where $n<m$.

14. A movement detection circuit according to claim 8 further comprising a time spatial filter connected to said signal combination circuit.

15. A movement detection circuit ued in a television receiver for detecting movement information of a digital luminance signal and movement information of a digital chrominance signal, comprising:

(a) first movement information detection means for receiving the digital luminance signal to generate the movement information of the luminance signal, said first movement information detection means including a first frame memory for delaying the luminance signal by one frame period, and a first subtractor connected to said first frame memory for subtracting the luminance signal applied to said first frame memory from the delayed luminance signal delayed by said first frame memory to generate the movement information signal of the luminance signal;

(b) second movement information detection means for receiving the digital chrominance signal to generate the movement information signal of the chrominance signal, said second movement information detection means including a second frame memory for delaying the chrominance signal by two frame periods, and a second subtractor connected to said second frame memory for subtracting the chrominance signal applied to said second frame memory from the delayed chrominance signal delayed by said second frame memory to generate the movement information signal of the chrominance signal; and (c) a signal combination circuit connected to said first movement information detection means and said second movement information detection means for receiving the movement information signal of the luminance signal from said first movement information detection means and the movement information signal of the chrominance signal from said second movement information detection means and combining the movement information signals to generate a combined movement information signal.

16. A movement detection circuit according to claim 15 further comprising a time spatial filter connected to said signal combination circuit for receiving the combined movement information signal from said signal combination circuit.

17. A movement detection circuit used in a television receiver for detecting movement information of a video signal, comprising:

(a) first movement information detection means including a first differential signal generation circuit and a first absolute value circuit, said first differential signal generation circuit including a first delay circuit and a first subtractor, said first delay circuit delaying the video signal by one frame period, said first differential signal generation circuit generating a first differential signal of two video signals spaced by one frame period, said first absolute value circuit producing an absolute value of the first differential signal to generate the first movement information signal;

(b) second movement information detection means including a second differential signal generation circuit and a second absolute value circuit, said second differential signal generation circuit including a second delay circuit and a second subtractor, said second delay circuit delaying the video signal by two frame periods, said second differential signal generation circuit generating a second differential signal of video signals spaced by two frame periods, said second absolute value circuit producing an absolute value of the second differential signal to generate the second movement information signal;

(c) a signal combination circuit connected to said first and second movement information detection means for receiving the first movement information signal from said first movement information detection means and the second movement information signal from said second movement information detection means and combining the first and second movement information signals to generate a combined movement information signal; and (d) a time spatial filter connected to said signal combination circuit for receiving the combined movement signal from said signal combination circuit, said time spatial filter including, a third delay circuit for delaying the combined movement information signal by one field period to generate a first delayed combined movement information signal, a fourth delay circuit for delaying the delayed combined movement information signal delayed by said third delay circuit by one horizontal scan period to generate a second delayed combined movement information signal, and a maximum value detection circuit for receiving the combined movement information signal from said signal combination circuit, the first delayed combined movement information signal from said third delay circuit and the second delayed combined movement information from said forth delay circuit, comparing those three signals and selecting the maximum one as the maximum signal output.

18. A movement detection circuit according to claim 17 wherein said second differential signal generation circuit includes a first frame memory, a second frame memory serially connected to said first frame memory and a subtractor connected to an input terminal of said first frame memory and an output terminal of said second frame memory.

19. A movement detection circuit according to claim 17 wherein said second differential signal generation circuit includes a first frame memory, a subtractor connected to an input terminal and an output terminal of said first frame memory, a second frame memory connected to an output terminal of said subtractor, and an adder connected to an input terminal and an output terminal of said second frame memory.

20. A movement detection circuit according to claim 17 wherein said second differential signal generation circuit includes a first frame memory, an adder connected to an input terminal and an output terminal of said first frame memory, a second frame memory connected to an output terminal of said adder, and a subtractor connected to an input terminal and an output terminal of said second frame memory.

* * * * *